United States Patent
Manescu et al.

(10) Patent No.: US 10,331,478 B2
(45) Date of Patent: Jun. 25, 2019

(54) SECURE DATA ONBOARDING AGENT NETWORK

(71) Applicant: Microsoft Technology Licensing, LLC, Redmond, WA (US)

(72) Inventors: Corneliu Manescu, Redmond, WA (US); Amit Bhambri, Sammamish, WA (US); Nutesh Garg, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 249 days.

(21) Appl. No.: 15/161,509

(22) Filed: May 23, 2016

(65) Prior Publication Data
US 2017/0337080 A1    Nov. 23, 2017

(51) Int. Cl.
| | | |
|---|---|---|
| *G06F 9/46* | (2006.01) | |
| *G06F 9/48* | (2006.01) | |
| *G06F 9/50* | (2006.01) | |
| *G06F 9/445* | (2018.01) | |
| *G06F 9/54* | (2006.01) | |
| *G06F 21/62* | (2013.01) | |
| *H04L 9/14* | (2006.01) | |
| *G06F 16/25* | (2019.01) | |

(52) U.S. Cl.
CPC ............ *G06F 9/4862* (2013.01); *G06F 9/445* (2013.01); *G06F 9/5011* (2013.01); *G06F 9/541* (2013.01); *G06F 16/254* (2019.01); *G06F 21/6245* (2013.01); *H04L 9/14* (2013.01); *G06F 2221/2107* (2013.01)

(58) Field of Classification Search
None
See application file for complete search history.

(56) References Cited

U.S. PATENT DOCUMENTS

| | | |
|---|---|---|
| 7,047,315 B1 | 5/2006 | Srivastava |
| 8,612,599 B2 | 12/2013 | Tung et al. |
| 9,172,766 B2 | 10/2015 | Narasimhan et al. |

(Continued)

FOREIGN PATENT DOCUMENTS

WO    2015167541 A2    11/2015

OTHER PUBLICATIONS

"Cloud Management—An Overview", Published on: Apr. 7, 2013 Available at: https://docs.oracle.com/cd/E24628_01/doc.121/e28814/cloud_overview_new.htm.

(Continued)

*Primary Examiner* — Diem K Cao
(74) *Attorney, Agent, or Firm* — Holzer Patel Drennan

(57) ABSTRACT

A data onboarding network includes a data onboarding configurator to generate a number of data onboarding objects, each of these data onboarding objects including subscription metadata for reading data from a data source and publication metadata for writing data to a destination data store. According to one implementation, the data onboarding system also includes an execution engine task store to store various data onboarding tasks, where the data onboarding tasks are configured to pull data from the data source using the subscription metadata and to write data to the destination data store using the publication metadata. An execution engine executes one or more of these data onboarding tasks.

19 Claims, 11 Drawing Sheets

(56) References Cited

U.S. PATENT DOCUMENTS

| | | | | |
|---|---|---|---|---|
| 2002/0156932 | A1* | 10/2002 | Schneiderman | G06F 9/4862 |
| | | | | 719/317 |
| 2005/0241533 | A1* | 11/2005 | Murakami | C04B 28/02 |
| | | | | 106/606 |
| 2012/0016778 | A1 | 1/2012 | Salle et al. | |
| 2012/0324069 | A1 | 12/2012 | Nori et al. | |
| 2013/0191418 | A1* | 7/2013 | Martin, Jr. | G06F 17/30569 |
| | | | | 707/802 |
| 2015/0066560 | A1 | 3/2015 | Madani et al. | |
| 2015/0066926 | A1* | 3/2015 | Dubois | G06F 19/3418 |
| | | | | 707/737 |
| 2015/0081617 | A1* | 3/2015 | Shaik | G06F 17/30563 |
| | | | | 707/602 |
| 2015/0281355 | A1 | 10/2015 | Maturana et al. | |
| 2016/0210427 | A1* | 7/2016 | Mynhier | G16H 50/20 |

OTHER PUBLICATIONS

Sampaio, Telmo, "Manage virtual network: Load balancer distribution mode", Retrieved on: Feb. 7, 2016 Available at: https://azure.microsoft.com/en-in/documentation/articles/virtual-networks-load-balancer-manage-distribution-mode-source-ip/.

Kleban, Chris, "Real-time Data Distribution with Apache Kafka", Published on: Aug. 21, 2015 Available at: https://www.ctl.io/blog/post/kafka-realtime-data/.

Singh, Raman, "Self-Service Integration is Key to Data Onboarding", Published on: Feb. 2, 2016 Available at: https://adeptia.com/blog/self-service-integration-key-data-onboarding.

"Connect Partners Faster with Self-service Onboarding", Published on: Mar. 5, 2015 Available at: http://www.seeburger.eu/fsi/gain-agility/connect-faster-with-self-service-onboarding.html.

"Smart OnBoarding Security", Published on: May 2015 Available at: http://smartonboarding.com/wp-content/uploads/2015/05/SmartOnBoardingSecurity.pdf.

* cited by examiner

SECURE DATA ONBOARDING AGENT NETWORK

BACKGROUND

In today's information society, computing systems store and process very large amounts of data, sometimes specified in petabytes (one million gigabytes). Furthermore, there are a large number of different data formats that are used for storing data. For example, relational database management systems use data that can be accessed using a structured query language. On the other hand, data on the world wide web using the representations state transfer architecture may use JavaScript® object notation (JSON) data format. Data analytic services may need to ingest and process massive amounts of data from such different data sources in real time.

SUMMARY

Implementations described herein disclose a data onboarding network that includes a data onboarding configurator to generate a number of data onboarding objects. Each of these data onboarding objects includes subscription metadata for reading data from a data source and publication metadata for writing data to a destination data store. The data onboarding system also includes an execution engine task store to store various data onboarding tasks, where the data onboarding tasks are configured to pull data from the data source using the subscription metadata and to write data to the destination data store using the publication metadata. An execution engine executes one or more of these data onboarding tasks.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

A data onboarding system disclosed herein is a highly scalable, distributed, and multi-domain system for onboarding data from a large number of disparate data sources into one or more of a large number of destination data stores. The data onboarding system provides a pluggable architecture which allows a user to plug in different data sources and destinations for data onboarding. An implementation of the data onboarding system includes a data onboarding configurator to generate a number of data onboarding objects. For example, such data onboarding objects may be generated in the form of extendible markup language (XML) schemas, however alternate forms of data onboarding objects may also be used. Each of these data onboarding objects includes subscription metadata specifying reading data from a data source and publication metadata for writing data to a destination data store.

For example, when a data source is a structured query language (SQL) database, the subscription metadata may specify reading the SQL database using an SQL reader. On the other hand, if the destination data source is a data store that stores data using streams, the publication metadata specifies writing data to such a destination data store. For example, such destination data store may use data streams to store data where a data stream is an ordered sequence of instances. Examples of data streams include computer network traffic, phone conversations, ATM transactions, web searches, etc.

An implementation of the data onboarding system also includes an execution engine task store and a number of data onboarding tasks. Such data onboarding tasks may also be specified in the form of XML schemas and may specify workflows for various combinations of subsection metadata and publication metadata. For example, if a data store is an SQL database, a data onboarding task may provide a task for each table of a such database. The data onboarding task may also specify whether to encrypt a column of the table, which key to use for encrypting the table, etc.

An execution engine of the data onboarding system performs the workflows defined in the data onboarding tasks. An implementation of the execution engine evaluates the number of data onboarding objects and allocates execution resources based on the number of data onboarding objects, execution resources required by each of the onboarding objects, number of execution resources available, one or more load balancing criteria, etc. For example, the execution resource allocated to the data onboarding objects may be an agent running on a virtual machine (VM) in a cloud environment, where such agent is allocated processing resources, memory resources, and other resources necessary for running the workflows.

Figure 1:
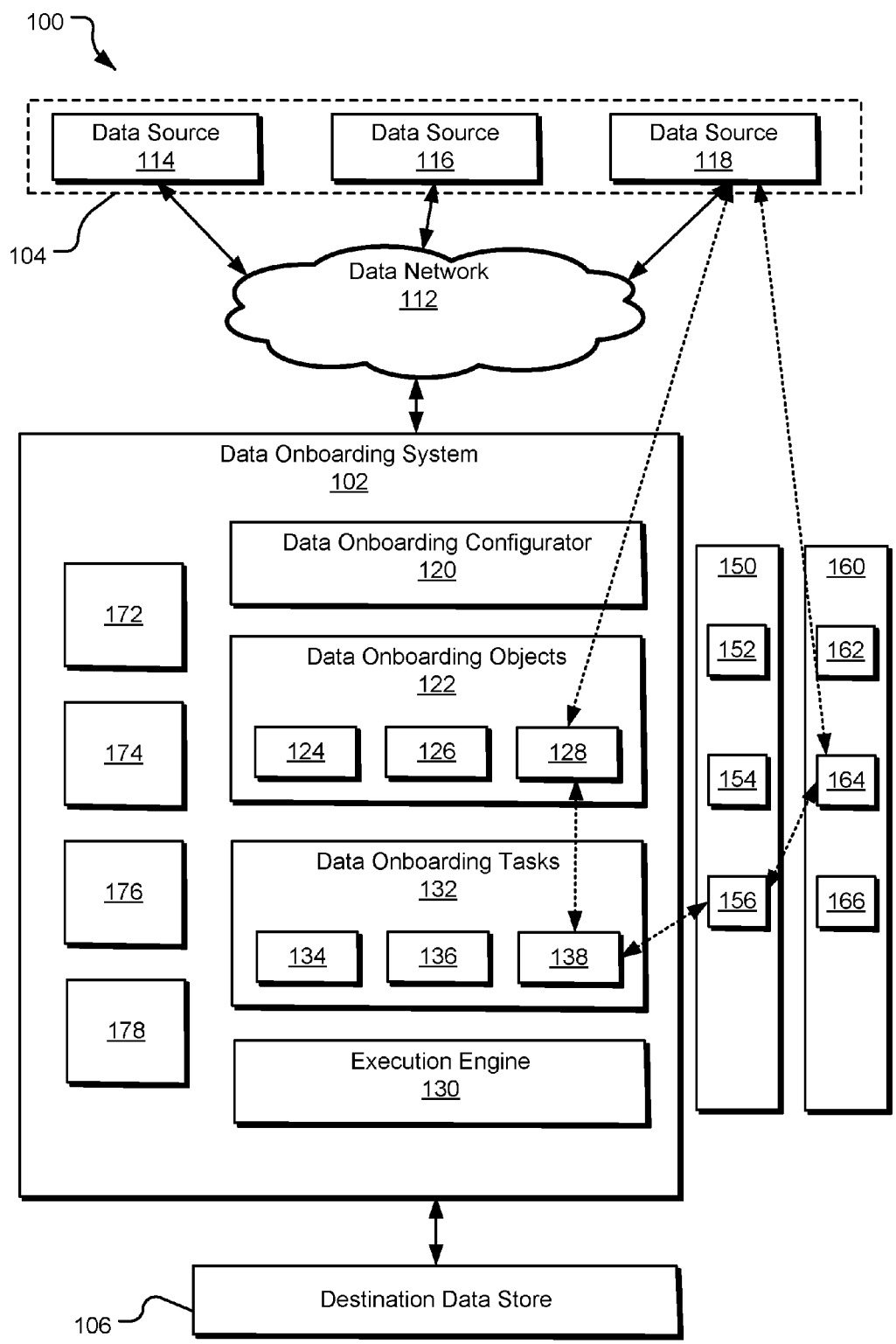
FIG. 1 illustrates an example data onboarding system for pulling data from a number of data sources and to write data to a destination data store.

FIG. 1 illustrates an implementation 100 of data onboarding system 102 working with various data sources 104 and a destination data store 106. The data sources 104 may include a number of different data sources, such as a data source 114 that is an SQL database, a data source 116 that stores data using JavaScript® object notation (JSON) data format, and a data source 118 that is a file format data store. The data sources 104 may be for a single enterprise or they may be for a number of different enterprises. For example, the data source 114 may be in internal customer relationship management (CRM) database of a company and the data source 116 may be a web data store for the same enterprise. Alternatively, the data source 116 may be an external data web data store that is made available to the enterprise for marketing purposes. To utilize the data from such disparate data sources 104 for data analytics purposes, it may be necessary for the enterprise to combine the data from each of such data sources. For example, the enterprise may be interested in determining which of the customers from the internal CRM database have shown interest in purchasing a product, where such interest may be indicated in the form of a user click as stored in the web data store.

The data onboarding system 102 allows the enterprise to onboard or pull data from the data sources 104 to the destination data store 106 for performing such analytics. For example, the destination data store 106 may be a big data analytics data store that stores data in streams, in which case, the data onboarding system 102 converts the data pulled from the data sources 104 into stream form before storing the data into the destination data store 106. An implementation of the data onboarding system 102 provides a scalable data onboarding service which can be deployed in a distributed and multi-domain environment. Such scalable implementation allows ingesting and processing a large amount of data from the data sources 104 in real time.

The implementation of the data onboarding system 102 is illustrated as communicating with the data sources 104 using a data network 112, such as the Internet, a virtual private network, a cloud based network, etc. The data onboarding system 102 includes data onboarding configurator 120 that generates data onboarding objects 122 for pulling or consuming data from the data sources 104. For example, the data onboarding configurator 120 may read the configuration of the data source 114 to determine that the data source 114 is an SQL database including a number of tables, the size of the database, etc. In one implementation, the data onboarding configurator 120 may be a computer processor or a virtual agent on a cloud network.

In an alternative implementation, the data onboarding system 102 provides a user interface to a user. Such user interface may be used by a partner to specify the configuration of various data sources 104 storing the data that is to be consumed by the data onboarding system 102. For example, a user at an enterprise partner may specify that the data source 114 is a CRM database for the enterprise. Furthermore, the user may also specify the number of tables in the CRM database, the size of the CRM database, and how often the data from the CRM database is to be pulled, etc.

The data onboarding configurator 120 takes the data source configurations and other information that may be provided by the user, analyzes the data source configuration and such other information provided by the user, and determines subscription metadata specifying how the data from the data source is to be processed. For example, the data onboarding configurator 120 may be a processor that analyzes the data source configurations and other information that may be provided by the user, to determine subscription metadata specifying how the data from the data source is to be processed. For example, for a destination data store 106 storing data in the form of streams, the data onboarding configurator 120 determines how data from each table is to be processed. For an example implementation where the data source 114 includes three tables, the data onboarding configurator 120 generates three sets of subscription metadata, respectively specifying how to read the data from each of these tables. Furthermore, the data onboarding configurator 120 also generates publication metadata from each of the three tables to specify how that data from these tables is to be stored on the destination data store 106. For example, if the destination data store 106 is a big data store storing data in the form of streams, the data onboarding configurator 120 generates publication metadata for each table to specify how to store data from each of these tables to the streams in the destination data store 106.

The subscription metadata and the publication metadata are combined to generate data onboarding objects 122. The illustrated implementation shows three such data onboarding object 124, 126, and 128. For example, the data onboarding object 124 may include subscription metadata for pulling data from a clients table of a CRM database in the data source 114 and publication metadata for writing the data read from the clients table to streams of the destination data store 106. Similarly, the data boarding object 126 may include subscription metadata for pulling data from a products table of the CRM database in the data source 114 and publication metadata for wiring the data read from the products table to streams of the destination data store 106. On the other hand, the data onboarding object 128 may include subscription metadata for reading data from a column in a flat file database in the data source 118 and publication metadata for writing such data read from the flat file database.

While the implementations illustrated in FIG. 1 include only three data onboarding objects 122, in reality a large number of such data onboarding objects 122 may be stored in the data onboarding system 102. For example, in one implementation, over thousands of data onboarding objects 122 may be stored in the data onboarding system 102. Such a large number of data onboarding objects 122 allows for a massively parallel system that can onboard data from a large number of heterogeneous sources of data.

The data onboarding system 102 also includes a number of data onboarding tasks 132 specifying workflow for processing the data onboarding objects 122. In one implementation, such data onboarding tasks 132 may be in the form of XML schemas specifying various processing parameters for the data onboarding objects 122. For example, the onboarding task schema may specify property of data columns as to whether a column needs to be encrypted on not. The data onboarding tasks 132 also include properties as to scheduling of the data onboarding tasks 132, how many execution agents are to be allocated to a task, etc.

Furthermore, a data onboarding task 134 may specify how often the data onboarding object 124 is to be processed, what is the priority of the data onboarding object 124, etc. If the data onboarding object 124 is used for consuming data from a table that is updated at a high frequency, the data onboarding task 134 may specify higher frequency for processing the data onboarding object 124. Similarly, if the data onboarding object 126 includes data that is important such that it has to be pulled at a higher priority, the data onboarding task 136 may specify that a processing agent is provided to execute the data onboarding object 126 even when a limited number of such execution agents are available. In one implementation, the data onboarding tasks 132 are also generated by the data onboarding configurator 120 based on its analysis of the data sources 104 and/or based on information provided by a partner user via a user interface.

An execution engine 130 allocates execution agents 150 to one or more of the data onboarding tasks 132. One or more of the execution agents 150 may be a virtual machine agent with processing and memory resource that can execute the workflow of a given data onboarding task. Thus, one such virtual machine agent may be used to implement different of the execution agents 150 at different times. The illustrated implementation shows three such agents 152, 154, and 156 that may be available for executing the workflows of the data onboarding tasks 132. Furthermore, the execution engine may also specify a data reader from data readers 160 for pulling data from the data sources 104. The illustrated implementation shows three such data readers 162, 164, and 166, wherein 162 may be an SQL data reader, 164 may be a JSON data reader, 166 may be a flat file data reader, etc.

As an example, the data onboarding task 138 may provide workflow for processing the data onboarding object 128 that pulls data from a data source 118 that is a flat file data source. In such an implementation, the execution engine 130 allocates an execution agent 156 to the data onboarding task 138 and based on the specification of the data onboarding task 138, the execution agent 156 uses a data reader 164 for reading data from the data source 118.

In one implementation of the data onboarding system 102, the execution engine 130 provides distributed automatic failover of the execution agents 150. In such an implementation, periodically one of the execution agents 150 becomes a leader and checks if the other of the execution agents 150 are still available for executing the assigned tasks. alive. If any of these other agents 152-156 are not available for executing the assigned tasks, the tasks assigned to such execution agents are put back in a pool of the onboarding tasks 134-136 such that other execution agents may execute such a task. Thus, for example, if an onboarding task 134 is assigned to an execution agent 152 and if the leader execution agent determines that the execution agent 152 is not available to execute the onboarding task 134, the onboarding task 134 is added back to the pool of onboarding tasks so that one of the other execution agents 154-156 executes the onboarding task 134.

The execution agents 150 are autonomous and dynamically scalable such that one more execution agents 150 can be added or removed to/from the data onboarding system 102 with no downtime, or impact to other execution agents 150. In this manner, the data onboarding system 102 provides a scalable data onboarding service by adding or removing execution agents 150 as needed. Thus, for example, if the execution engine 130 determines that the data onboarding tasks 132 far exceeds the number of available execution agents 150, it may request provisioning of addition execution agents 150. In one implementation, additional virtual machine agents may be allocated to serve as additional execution agents 150.

In one implementation, the data onboarding tasks 132 may be interdependent and the execution engine 130 supports execution of such set of inter-dependent data onboarding tasks based on defined dependency graphs and failure policies. For example, a task 136 will be executed only if all the tasks that it is dependent on have completed and any failures are accepted by the failure policy for the workflow. In one alternative implementation, the execution engine 130 supports per-task custom defined timeout or error retry policies, as well as task execution throttling—where only specific combinations of data onboarding tasks 132 up to a predefined task counts are allowed to be executed in parallel by the engine.

The execution engine 130 may also support auto-load-balancing based on load balancing policies that account for work capacity of the execution agents 150 and defined capacities of the data onboarding tasks 132. Further the affinity domains can be used to specialize or limit the pool of execution agents 150 that can execute onboarding tasks 132. Furthermore, the data onboarding tasks 132 that transfer data from data sources 104 to destination data store 106 can contain, besides ingestion, encryption, and upload, any data transformation or processing task that is defined according to the task definition knows by the execution engine 130.

The data onboarding system 102 also includes a number of other components such as a custom logging module 172 that provides custom logging and monitoring capabilities wherein the activity of the execution agents 150 are logged to ensure the integrity of the data collected from the disparate data sources 104. A load balancing module 174 provides capabilities to ensure that the data sources 104 can handle the data load. For example, the load balancing module 174 determines the number of threads that the data source 114 can handle, determines the number of available execution agents 150, and determines the number of execution agents 150 to be allocated to the data sources 114. An encryption/decryption module 176 determines which data from the data sources 104 is to be encrypted and allocate encryption/decryption keys to be used for such data. An affinity domain module 178 provides affinity domain capability which allows allocating variable numbers of execution agents 150 to a data onboarding task 132 based on the data onboarding need of a data onboarding task 132 and the data onboarding capability of each execution agents 150. Each of these modules 172-178 are discussed below in further detail.

Figure 2:
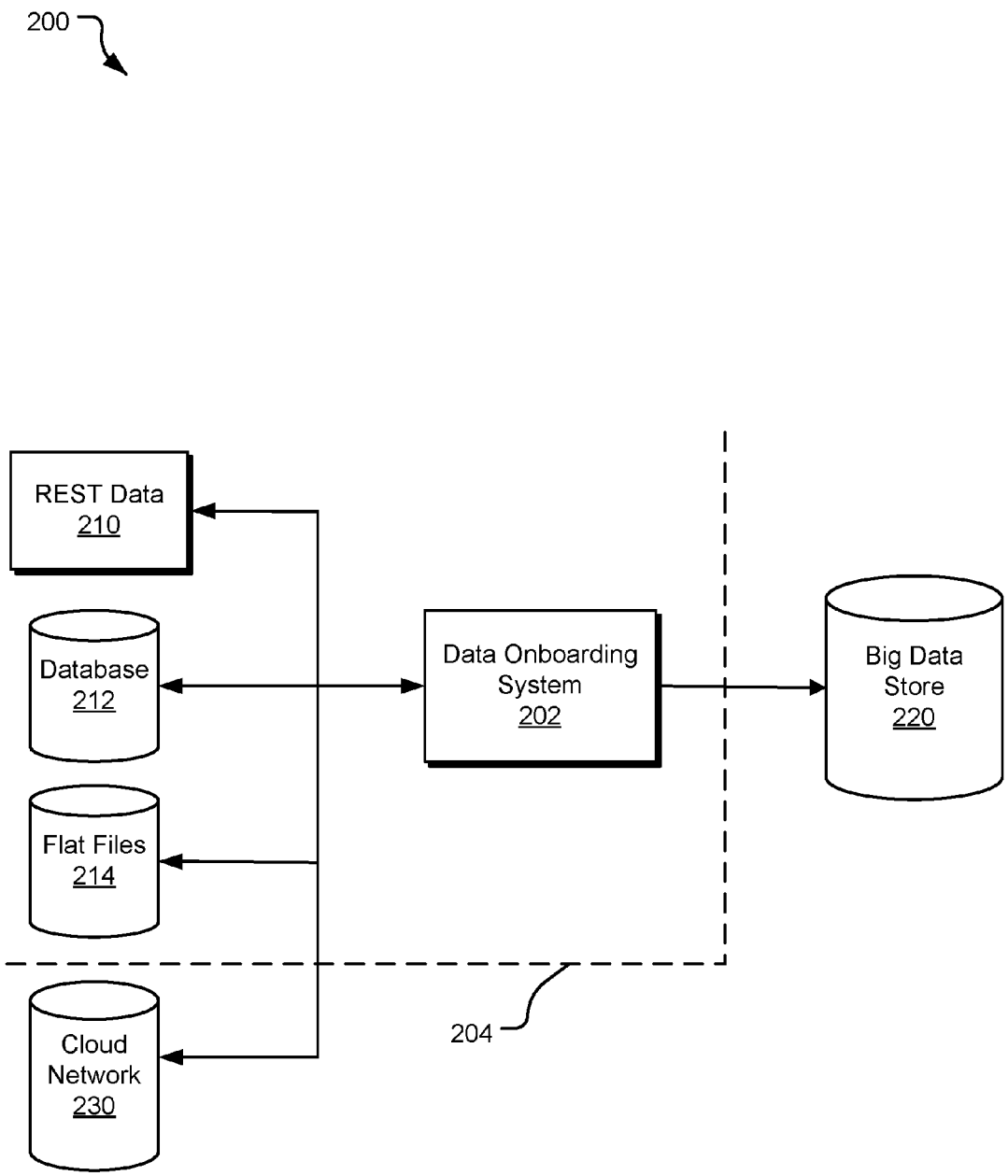
FIG. 2 illustrates an example implementation of a data onboarding system working with various data sources and a big data destination data store.

FIG. 2 illustrates an implementation 200 of a data onboarding system 202 using a cloud based network of execution agents and data readers. Specifically, in this implementation the data onboarding system 202 is implemented within an enterprises platform 204. The data onboarding system 202 may pull data from various enterprise data sources, such as a representational state transfer (REST) data source 210 storing the enterprise's web data, a database 212 storing the enterprise's client data, a flat file data source 214, etc. The data onboarding system 202 pulls data from such disparate data sources and writes the data to a big data analytics data store 220. The data onboarding system 202 uses execution agents and data readers available via a cloud network 230. Specifically, the data onboarding system 202 may create and store a number of data onboarding objects and tasks that are called by an execution engine of the data onboarding system 202 to perform various workflows using the execution agents and readers available via the cloud network 230.

Figure 3:
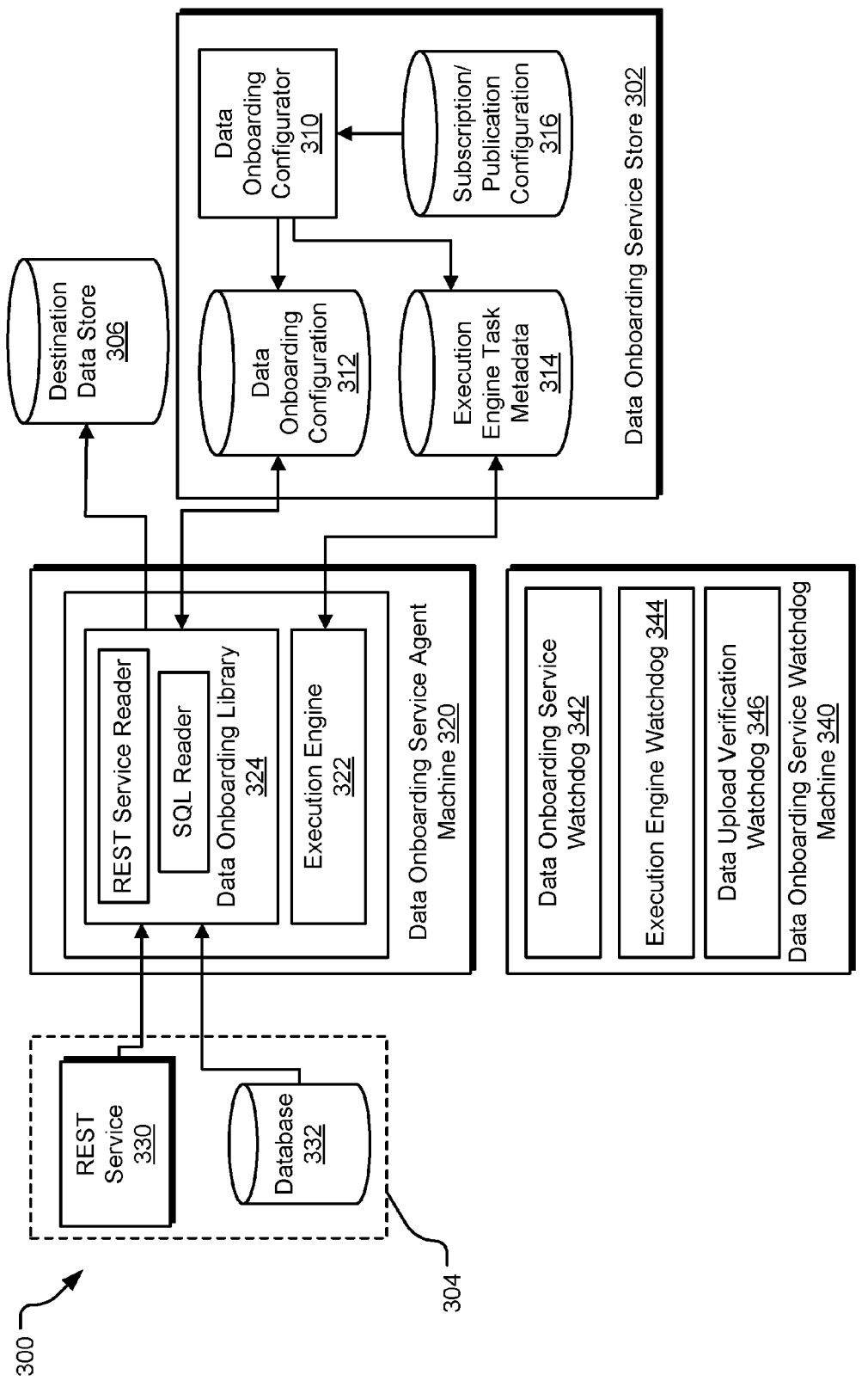
FIG. 3 illustrates an alternative example implementation of a data onboarding service disclosed herein.

FIG. 3 illustrates an alternative implementation 300 of a data onboarding service. In the illustrated implementation, the data onboarding service is implemented with a data onboarding service store 302 separate from an execution engine 322, which is implemented on a data onboarding service agent machine 320. For example, the data onboarding service store 302 may be implemented on a server and the data onboarding service agent machine 320 may be implemented on a cloud providing a number of execution agents. Besides the execution engine 322, the data onboarding service agent machine 320 also includes a data onboarding library 324 that has various readers, including a REST service reader, an SQL reader, etc.

The data onboarding service store 302 includes a data onboarding configurator 310 that interacts with the data sources 304 and a destination data store 306 to determine data onboarding configurations 312 as well as subscription/publication configurations 316. For example, the subscription/publication configurations 316, which may be stored in the form of XML schemas, may include the subscription schemas for reading various data tables, data files, JSON data, etc., from the data sources 304 and various publication schemas for writing the read data to the destination data store 306. On the other hand, the data onboarding configurations 312 may relate the subscription/publication configurations 316 and provide information that may be used by the readers of the data onboarding library 324. The data onboarding service store 302 also includes execution engine task metadata 314 that stores workflows specifying how the data onboarding configurations 312 is to be processed, such as the priority of particular data onboarding configurations 312, the number of service agents to be allocated to a task, etc.

The data onboarding service agent machine 320 interacts with various data sources 304, including the REST service data source 330 and the database 332, the destination data store 306 and the data onboarding service store 302. Specifically, the execution engine 322 executes the execution engine task metadata 314 by allocating one or more service agents to such execution engine task metadata 314. During execution of the workflows specified by the execution engine task metadata 314, the service agents of the data onboarding service agent machine 320 may invoke one of the readers from the data onboarding library 324 to read data from the data sources 304, process the data based on the execution engine task metadata 314 and write the processed data to the destination data store 306.

The implementation 300 of the data onboarding service allows flexible deployment of execution agents from the data onboarding service agent machine 320 to execute various workflows specified by the execution engine task metadata 314. The data onboarding configurator 310 may create, save, and update the subscription/publication configurations 316 for a large number of different data sources 304 and destinations and data onboarding configurations 312 to onboard data using such configurations. In one implementation, the data onboarding configurator 310 generates such subscription/publication configurations 316 by analyzing the data sources 304 and/or destination data store 306. The data onboarding configurator 310 may publish such subscription/publication configurations 316 for a user to review and revise and then store the revised subscription/publication configurations 316. In an alternative implementation, a user may provide various information about the data sources 304 and the destination data store 306 using a user interface, and the data onboarding configurator 310 uses such user-provided information to generate the subscription/publication configurations 316 and the data onboarding configurations 312.

The implementation 300 of the data onboarding service also includes a data onboarding service watchdog machine 340, including various watchdogs to monitor the performance of the data onboarding service. A data onboarding service watchdog 342 monitors overall data onboarding service. For example, the data onboarding service watchdog 342 may monitor performance of each service agent allocated by the data onboarding service agent machine 320 and in case a service agent fails to complete the workflow that is assigned to it, the data onboarding service watchdog 342 alerts other service agents as well as the data onboarding service agent machine 320 of such failure. An execution engine watchdog 344 monitors the operations of the execution engine 322 to ensure integrity of the execution of various data onboarding tasks. A data upload verification engine 346 ensures accuracy and completeness of data uploaded to the destination data store 306. For example, the data upload verification engine 346 keeps track of the number of records from a given data source 304 and compared it with the number of records in the destination data store 306 resulting from data upload from the given data source 304 to verify the completeness of the data onboarding operations.

Figure 4:
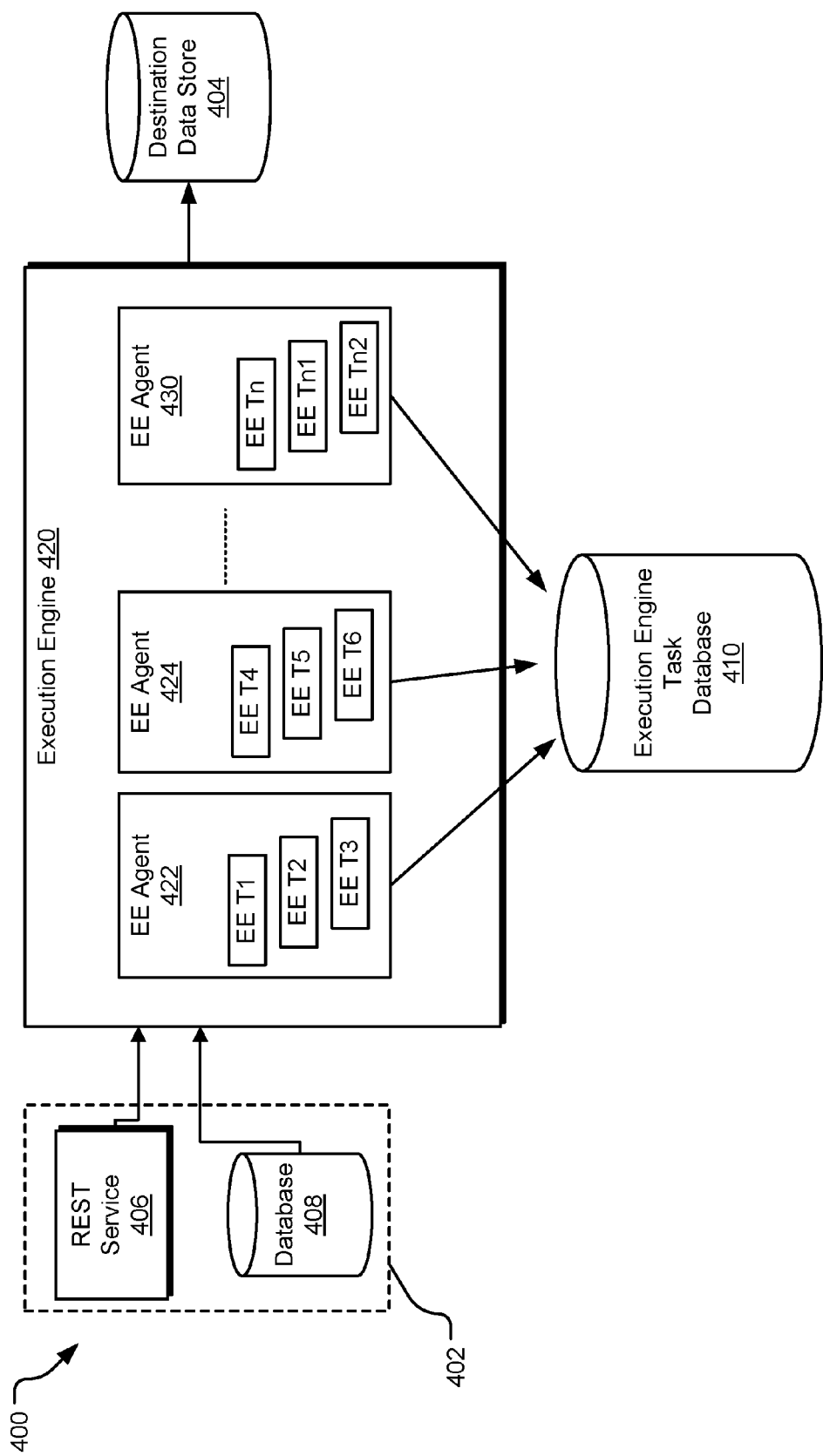
FIG. 4 illustrates an example implementation of a data onboarding service where an execution engine uses task flows to onboard data from various data sources to a destination data store.

FIG. 4 illustrates an alternative implementation 400 of a data onboarding service where an execution engine 420 uses task flows to onboard data from various data sources 402 to a destination data store 404. Specifically, the execution engine 420 is able to check out data onboarding tasks from an execution engine task database 410 to onboard data from various data sources 402 to a destination data store 404. The execution engine 420 may include a plurality of execution engine agents 422, 424, 430, each including a plurality of execution tasks EE T1-EE Tn2.

For example, an execution engine agent 422 may check out one or more execution tasks EE T1, EE T2, EE T3, from the execution engine task database 410, wherein each of such tasks onboard data from a data source 402, including a REST service 406 and a database 408, to the destination data store 404. An example of such a task EE T1 may be a JsonToDatacenter task that onboards data from a JSON data base to a data center used for big data analytics. Another example of such a task may be SQLStreamToDatacenter task that onboards data from an SQL database to a data center used for big data analytics.

Figure 5:
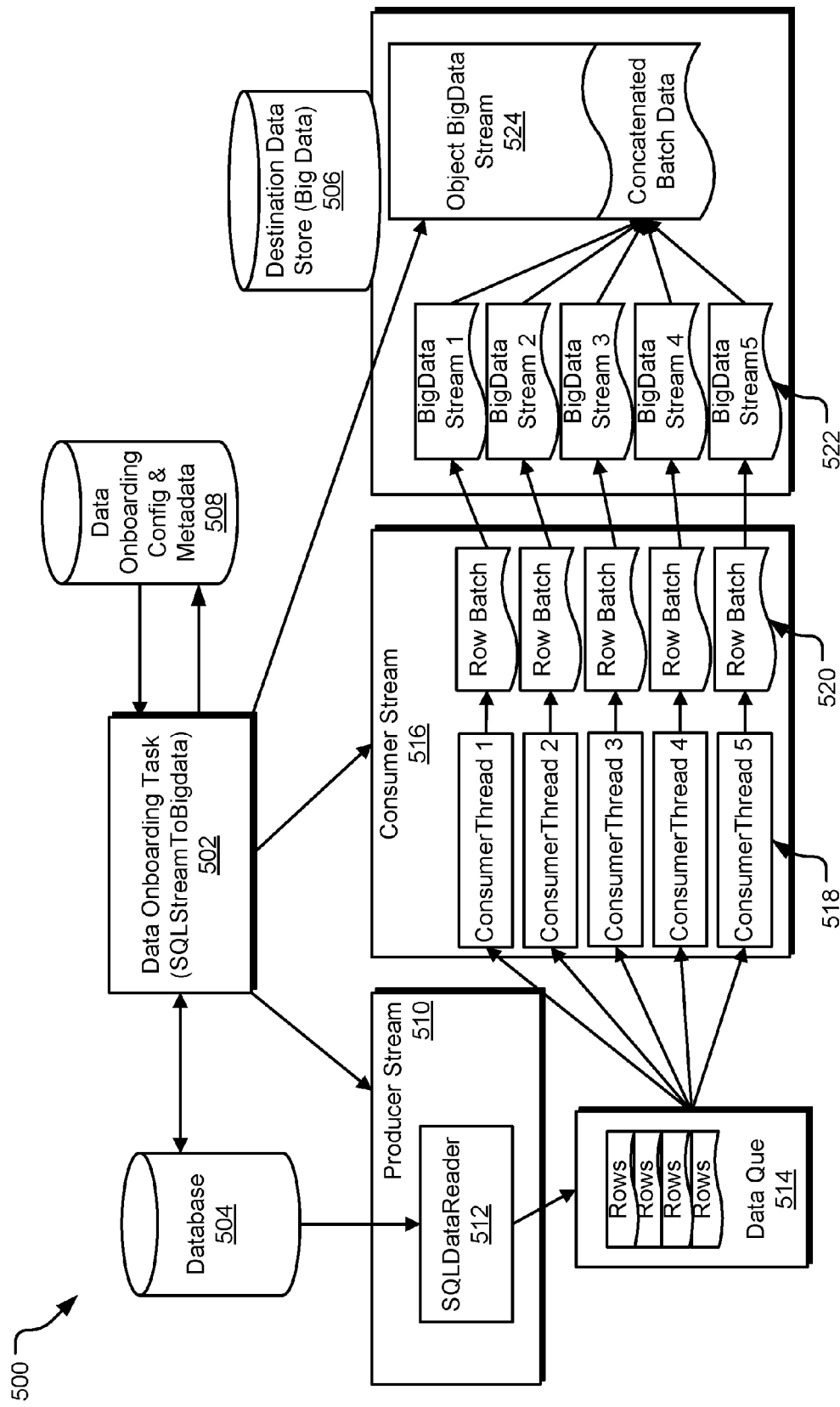
FIG. 5 illustrates an example workflow of a data onboarding task that may be checked out by an execution engine service agent to onboard data from an SQL database to a big data store.

FIG. 5 illustrates a workflow 500 of a data onboarding task 502 that may be checked out by an execution engine service agent to onboard data from a SQL database to a big data store. Specifically, the data onboarding task 502, identified herein as SQLStreamToBigdata, when executed by a service agent, reads data onboarding configuration/metadata for the task from a data onboarding configuration and metadata store 508. The onboarding task 502 validates the configuration and metadata for the task with the database 504. After validating, the data onboarding task 502 performs initial set up for onboarding data from the database 504 to the destination data store 506, identified herein as the Big Data.

The data onboarding configuration/metadata read from the data onboarding and configuration metadata store 508 may provide query parameters such as maximum time between submitting queries into the SQL database 504, the start time for the query, and the end time for the query. The data onboarding task 502 prepares SQL query batches to be submitted to the SWL database 504 based on such query parameters.

Once the SQL query batches are prepared, for each SQL query batch, the data onboarding task 502 creates SQL producer and adds it to the produce stream 510. The data onboarding task 502 also generates a consumer and adds it to the consumer stream 516 for the destination data store 506. The SQL producer in the producer stream 510 executes the SQL producer using an SQL data reader 512 and adds the resulting rows of data to a data queue 514. One or more of the consumer threads 518 in the consumer stream 516 reads the row of data from the data queue 514 and stores the read rows into row batches 520. The number of rows per row batches 520 may be determined by the capacity of the destination data store 506 to read batches, which may be, for example, 4 GB per batch, etc.

The consumer threads 518 create and/or append the row batches 520 into the data streams 522 in the destination data store 506. When all consumer threads 518 have completed creating/appending the row batches 520 into the data streams 522, the consumer stream 516 concatenates the data streams 522 into the existing object stream 524, identified herein as the Big Data, of the destination data store 506. After confirming the concatenation of the data streams 522 into the existing object stream 524, the data onboarding task 502 updates one or more parameters of the data onboarding configuration and metadata store 508.

Figure 6:
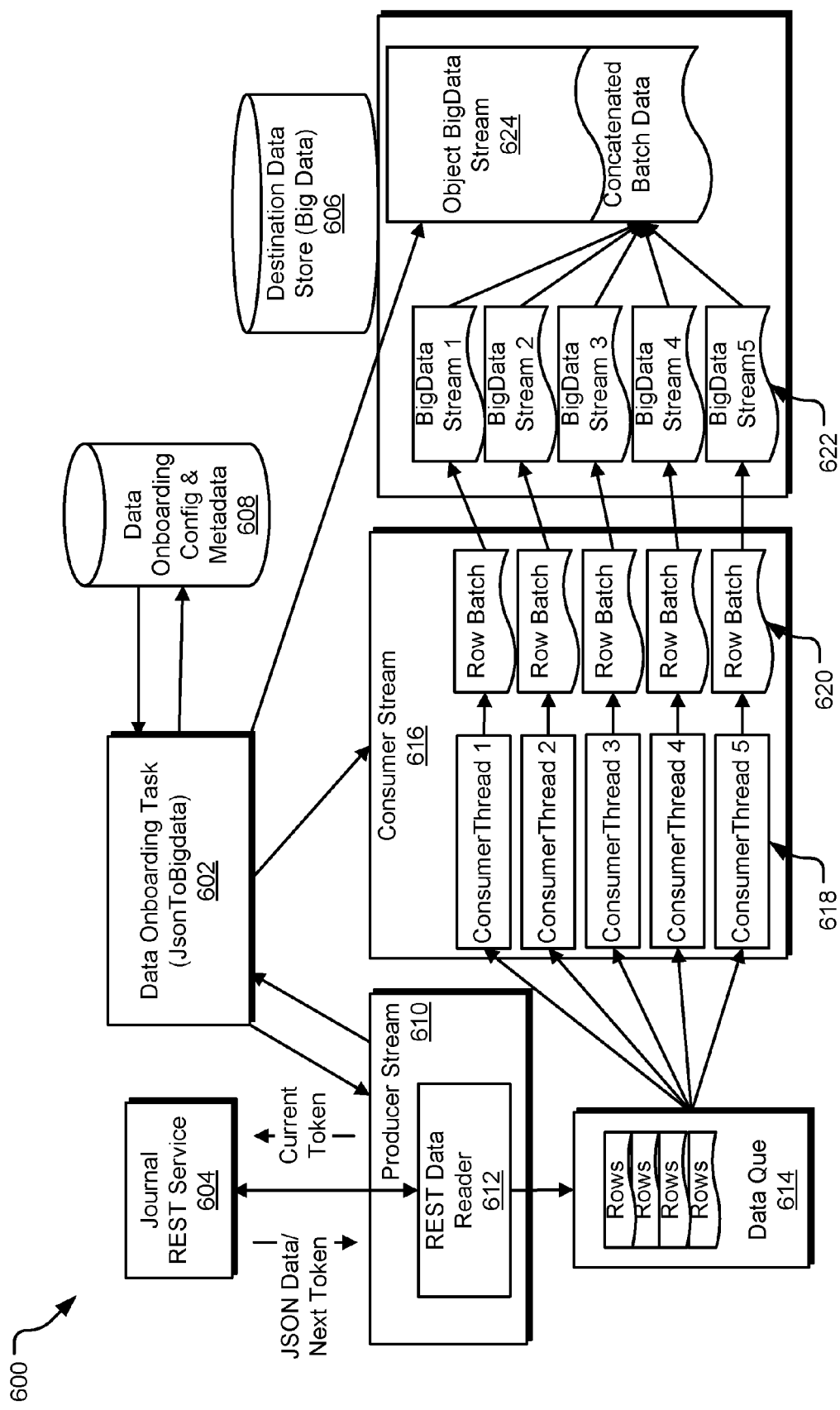
FIG. 6 illustrates an example workflow of a data onboarding task that may be checked out by an execution engine service agent to onboard data from an SQL database to a big data store.

FIG. 6 illustrates a workflow 600 of a data onboarding task 602 that may be checked out by an execution engine service agent to onboard data from an SQL database to a big data store. Specifically, the data onboarding task 602, identified herein as JsonToBigdata, when executed by a service agent, reads data onboarding configuration/metadata for the task from a data onboarding configuration and metadata store 608. The onboarding task 602 validates the configuration and metadata for the task with the Journal REST Service 604. After validating, the data onboarding task 602 performs an initial set up for onboarding data from the Journal REST Service 604 to the destination data store 606, identified herein as the Big Data. The data onboarding task 602 also creates a stream and schema in the destination data store.

After the initial setup, the data onboarding task 602 compares a last continuation token with a next continuation token and if the last continuation token is not equal to the next continuation token, the data onboarding task 602 creates a JSON producer object and adds it to the producer stream 610. The data onboarding task 602 also creates a consumer thread and adds it to the consumer stream 616 for the destination data store 606. The JSON producer object in the producer stream executes an HTTP REST call using a REST data reader 612 to the journal REST service 604 to receive JSON data. Furthermore, at this stage, the last continuation token is passed to the journal REST service 604 and the next continuation token is received with the data from the journal REST service 604. The JSON producer adds the resulting data rows to a data queue 614.

One or more of the consumer threads 618 in the consumer stream 616 reads the row of data from the data queue 614 and stores the read rows into row batches 620. The number of rows per row batches 620 may be determined by the capacity of the destination data store 606 to read batches, which may be, for example, 4 GB per batch, etc. Subsequently, the consumer threads 618 create and/or append the row batches 620 into the data streams 622 in the destination data store 606. When all consumer threads 618 have completed creating/appending the row batches 620 into the data streams 622, the consumer stream 616 concatenates the data streams 622 into the existing object stream 624 of the destination data store 606. After confirming the concatenation of the data streams 622 into the existing object stream 624, the data onboarding task 602 reads the next continuation token from the JSON producer and updates the next continuation token in the data onboarding configuration and metadata store 608.

Figure 7:
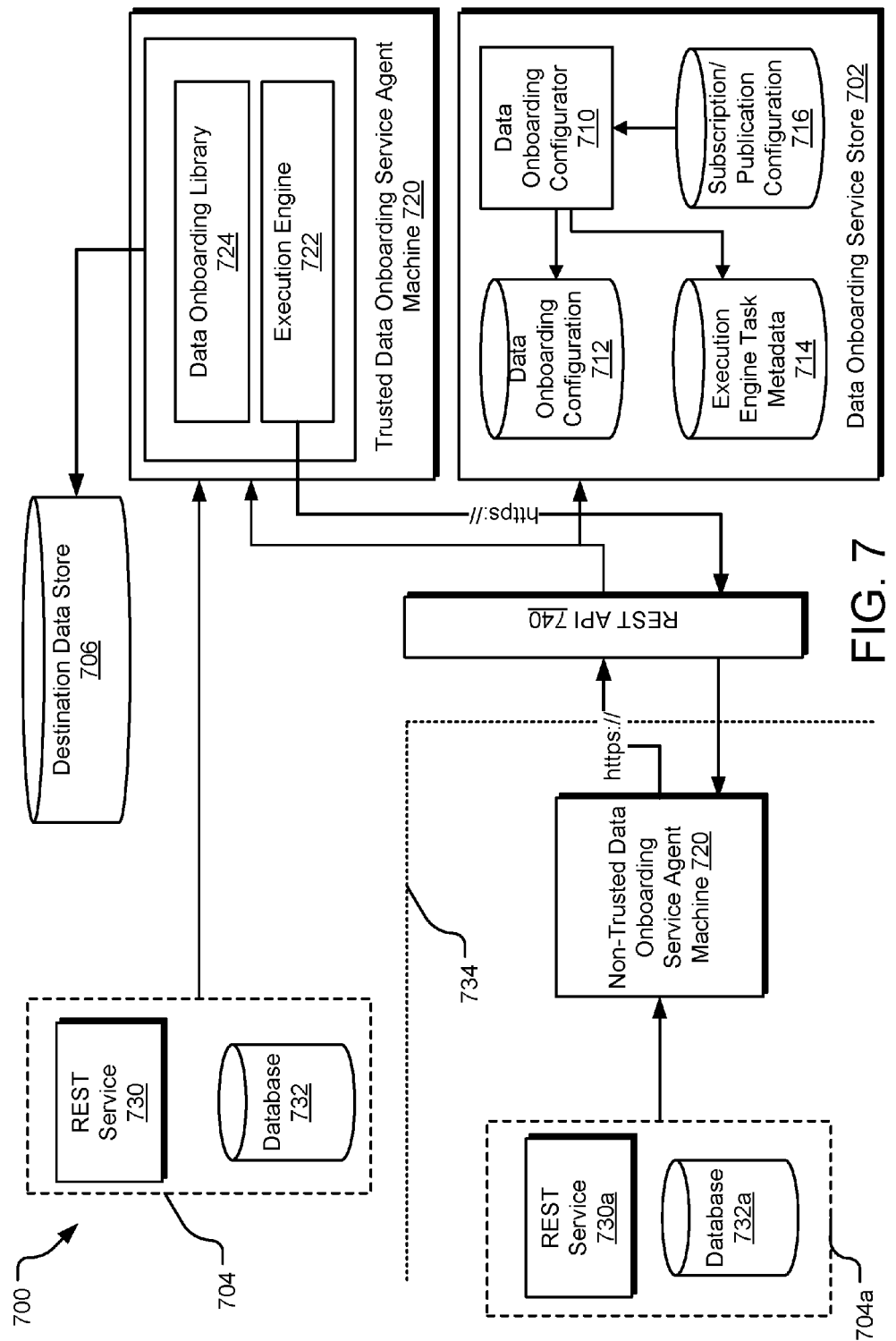
FIG. 7 illustrates an alternative example implementation of a data onboarding service across multiple domains.

FIG. 7 illustrates an alternative implementation 700 of a data onboarding service. In the illustrated implementation, the data onboarding service is implemented with a data onboarding service store 702 separate from an execution engine 722, which is implemented on a trusted data onboarding service agent machine 720. For example, the data onboarding service store 702 may be implemented on a server and the data onboarding service agent machine 720 may be implemented on a cloud providing a number of execution agents. Besides the execution engine 722, the data onboarding service agent machine 720 includes a data onboarding library 724 that has various readers including a REST service reader, an SQL reader, etc.

The data onboarding service store 702 includes a data onboarding configurator 710 that interacts with the data sources 704 and a destination data store 706 to determine data onboarding configurations 712 as well as publication/subscription configurations 716. For example, the publication/subscription metadata, which may be stored in form of XML schemas, may include the subscription schemas for reading various data tables, data files, JSON data, etc., from the data sources 704 and various publication schemas for writing the read data to the destination data store 706. On the other hand, the data onboarding configuration 712 may relate the subscription configurations and the publication configurations and provide information that may be used by the readers of the data onboarding library 724. The data onboarding service store 702 also includes execution engine task metadata 714 that stores workflows specifying how the data onboarding configuration 712 is to be processed, such as the priority of particular data onboarding configuration 712, the number of service agents to be allocated to a task, etc.

The data implementation 700 also includes data sources 704*a* that are located within a non-trusted domain 730, such as a red domain. For example, the data sources 704*a* may include a REST service 730*a* and a database 732*a* within an order management system of an enterprise. As these data sources 704*a* are within a non-trusted domain, it is not possible for the data onboarding service store 702 or the trusted data onboarding service agent machine 720 to access these data sources to determine the data onboarding configuration 712 or the subscription/publication configuration 716.

To address this problem of access to the data sources 704*a* in the non-trusted domain 734, the implementation 700 provides a non-trusted data onboarding service agent machine 720*a* that is located within the non-trusted domain 734. Specifically, the non-trusted data onboarding service agent machine 720*a*, including one or more execution agents (also referred to as light weight agents (not shown)) accesses the data onboarding service store 702 and the execution engine 722 via a REST based application programming interface (API) 740 that can be accessed only via a secure HTTPS interface. Specifically, the light weight agents are able to push data to the data onboarding service store 702 over the secure HTTPS using the REST API 740. Furthermore, the execution engine 722 is able to allocate one or more of the light weight agents to the execution engine 722 tasks stored in the execution engine task metadata 714.

Figure 8:
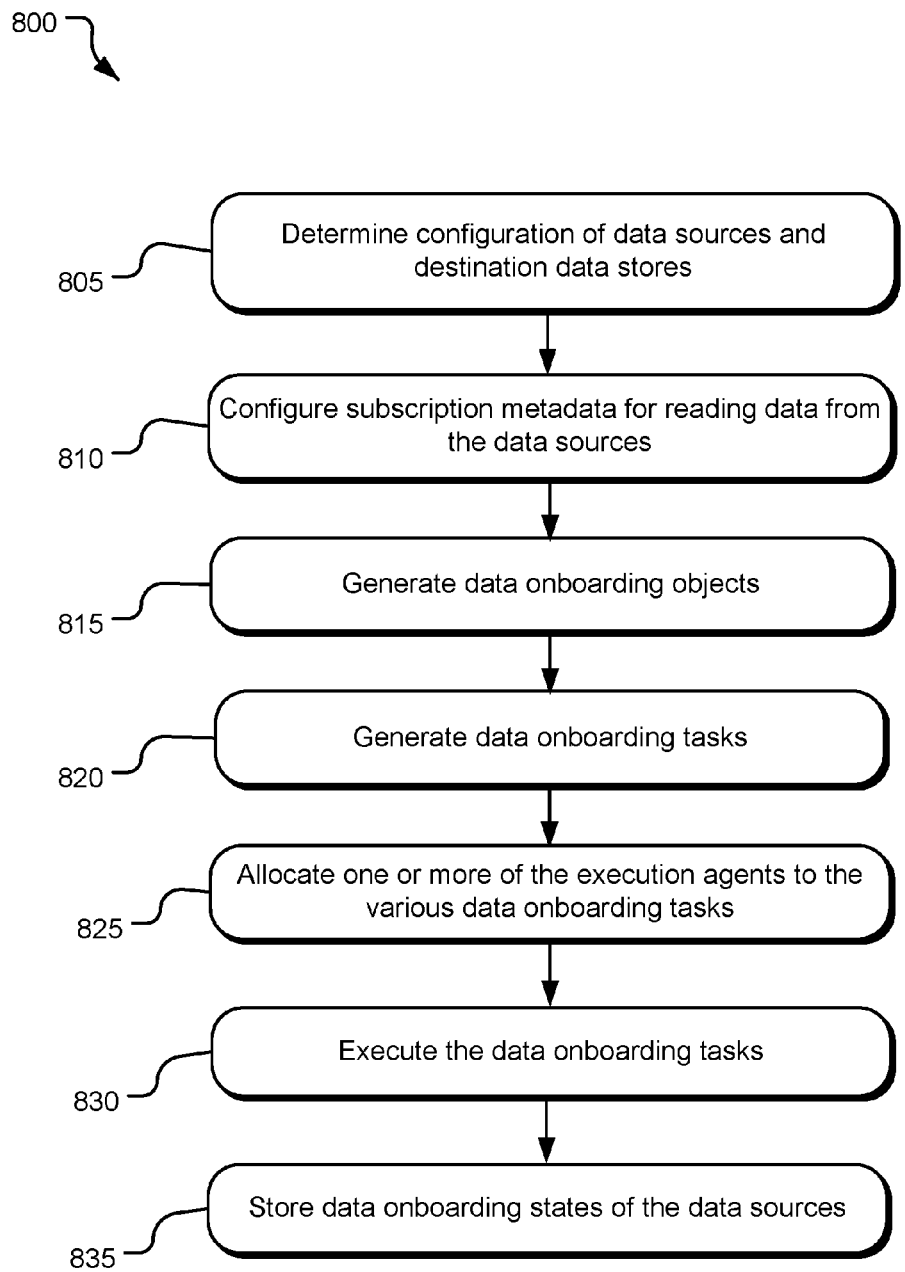
FIG. 8 illustrates example operations for providing data onboarding services to onboard data from a number of disparate data sources to a destination data store.

FIG. 8 illustrates operations 800 for providing data onboarding services to onboard data from a number of disparate data sources to a destination data store. A determination operation 805 determines configuration of data sources and destination data stores. For example, the one or more data sources may be different data sources, such as a flat file data source, an SQL database, a JSON data source, etc., that are located across multiple domains. The destination data stores may be, for example, a big data analytics data store, a Hadoop data store, etc. In one implementation, the determining operation 805 may determine the configuration of the data sources and the data destination stores based on information received from a user via a user interface. In an alternative implementation, the determining operation may determine configuration information about the data sources and the destination data store by accessing the data sources and the destination data stores and analyzing the structure thereof.

A configuration operation 810 configures subscription metadata for reading data from the data sources. For example, such subscription metadata may specify the structure of the tables in the data sources, the names of various tables, fields, etc. The configuration operation 810 also configures publication metadata for wiring data to the destination data stores. For example, if a destination data store stores data in streams, the publication metadata may specify various parameters of such stream.

A generating operation 815 generates data onboarding objects for onboarding data from one or more of the data sources to the one or more of the destination data stores. In one implementation, the onboarding data objects may be in the form of XML, schemas that include the subscription metadata, the publication metadata, and other metadata relating the subscription metadata to the publication metadata.

Another generating operation 820 generates data onboarding tasks, with each of the data onboarding tasks specifying task workflows for data onboarding. The task workflows may specify, for example, how often that data onboarding task is to be executed, various parameters of the data onboarding task, priority levels for the data onboarding tasks, the amount of resources or execution agents that are to be allocated to the data onboarding tasks, etc. In one implementation, the data onboarding tasks may be generated in the form of XML schemas.

An allocating operation 825 allocates one or more of the execution agents to the various data onboarding tasks. For example, such execution agents may be cloud based execution agents where each agent is allocated processing and memory resources for executing the tasks allocated thereto.

An executing operation 830 executes the data onboarding tasks. For example, such executing the data onboarding tasks may involve an execution agent executing the work flow of the data onboarding tasks by calling one or more data readers such as an SQL data reader for reading data from an SQL database, a REST service reader for reading data from a REST service, etc. Executing the data onboarding tasks A storing operation 835 stores data onboarding states of the data sources. For example, the storing operation 835 may determine the record number that was last stored for a given table from the data source and store that information for future use by one or more of the data onboarding tasks.

Figure 9:
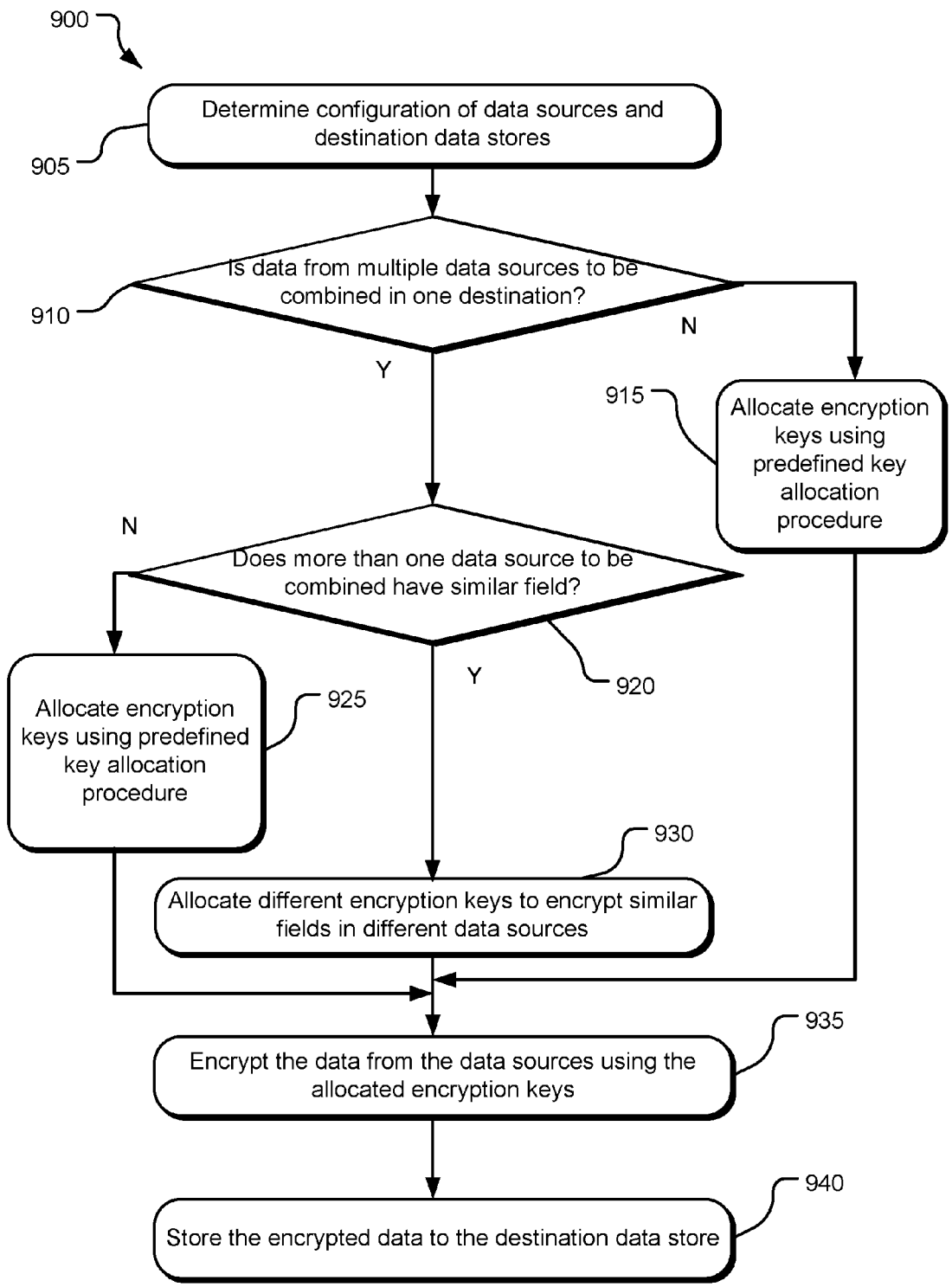
FIG. 9 illustrates example operations for encrypting data during data onboarding.

FIG. 9 illustrates operations 900 for encrypting data during data onboarding. Specifically, the operations 900 provide for encrypting data such that the data stored on a destination data store is highly secure. A determining operation 905 determines configuration of data sources and destination data stores. Such determining operation may involve determining the type of data sources, the type of data stored therein, etc. For example, the determining operation 905 may determine that a first data source is an SQL database with a number of tables storing information about clients of an enterprise and a second data source is also an SQL database with a number of tables storing information about product subscriptions for the enterprise.

A determining operation 910 determines whether data from multiple data sources is to be combined in one destination data store. For example, the determining operation 910 may determine that data from each of the first data source and the second data source are to be combined and stored in the destination data store. If this is not the case, an operation 915 allocates encryption keys using predefined encryption key allocation procedure. An example predefined encryption key allocation procedure may provide that the data from each of the first data source and the second data source is stored using encrypted key exchange method using the same public key.

However, if data from each of the first data source and the second data source are to be combined and stored in the destination data store, another determining operation 920 determines if more than one of the data sources to be combined have a similar field. For example, the first data source has a table with a field titled "lname" indicating a client's last name and the second data source has a table with a field titled "l_name," also indicating a client's last name. If so, when the data from these two tables is encrypted using a same key and stored in the destination data store, a data breach makes the data from these fields to be more likely to be decoded.

In such a case, an operation 930 allocates different keys to encrypt the similar fields in the different data sources. For example, a first encryption key is used to encrypt the data from the table having the field "lname" and as second encryption key is used to encrypt the data from the table having the field "l_name." As a result, when the encrypted data from these two data sources is stored in a single destination data source, the encrypted hash values do not show any similarities with each other and therefore, even in case of data breach, it is less susceptible for being decoded. In one implementation, the operation 930 allocates different keys to encrypt the similar fields in the different data sources when such fields store information that may require higher security. For example, if the similar fields in the different data sources store credit card information, the operation 930 allocates different keys to encrypt the similar fields from the different data sources. On the other hand, if the similar fields in the different data sources store information about the number of seats in a user's car, given the low sensitivity to security of such information, the operation 930 may not allocate different keys to encrypt such similar fields in the different data sources.

If no similar fields are found across different data sources, an operation 925 allocates encryption keys using predefined encryption key allocation procedure.

An operation 935 encrypts the data from the data sources using the allocated encryption keys, which may be as per a predefined encryption key allocation procedure or using differential encryption keys as per the operation 930. An operation 940 stores the encrypted data to the destination data store. Such encryption of data from similar fields across different data sources provides for enhanced security of personally identifiable information (PII) stored in the data sources.

Figure 10:
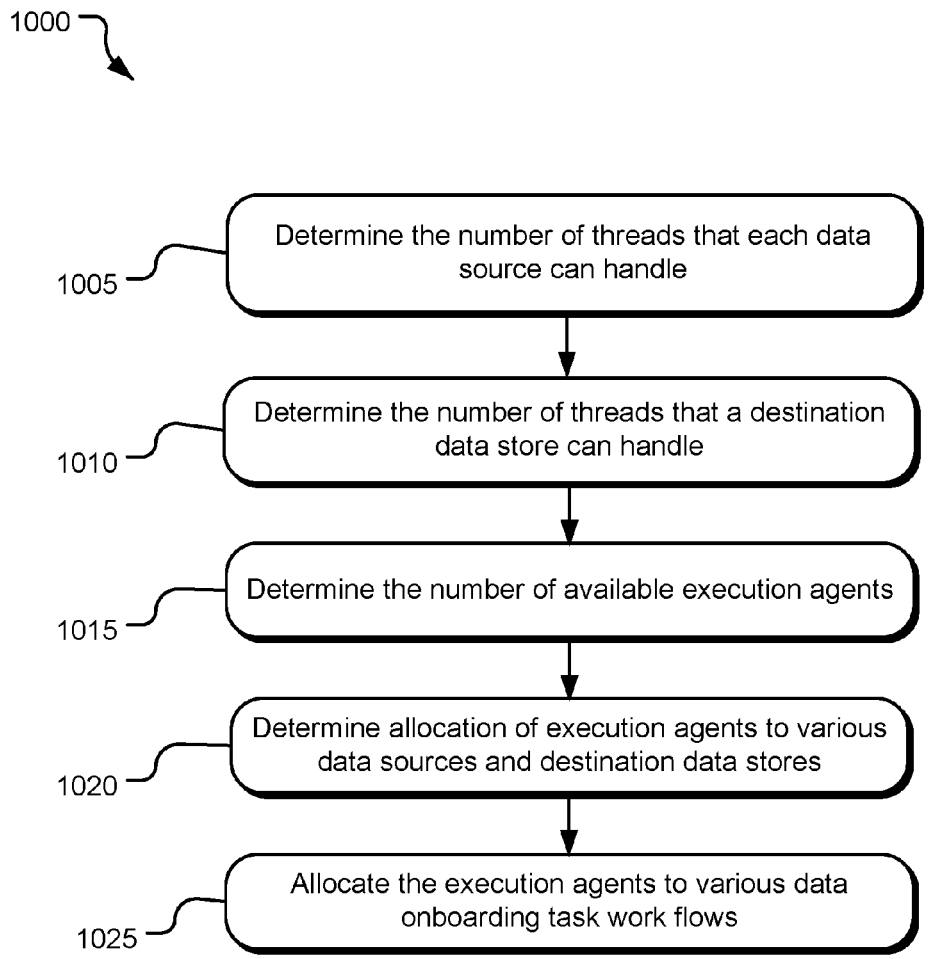
FIG. 10 illustrates example operations for determining allocation of execution agents to various tasks to balance loads on one or more of the data sources.

FIG. 10 illustrates operations 1000 for determining allocation of execution agents to various tasks so as to balance loads on one or more of the data sources. Specifically, data sources, such as SQL databases, REST services, etc., can support a limited number of threads working with them before showing decline in throughput. For example, if ten threads are simultaneously working with an SQL database, the SQL database may show a decline in response time, accuracy of response, etc. The operation 1000 provides load balancing during data onboarding from such data sources.

A determining operation 1005 determines the number of threads that each data source can handle. Such determination may be based on analysis of the configuration of such a data source, based on information received from a user via a user interface, etc. An operation 1010 determines the number of threads that a destination data store can handle. Again, such determination may be based on analysis of the configuration of such a destination data store, based on information received from a user via a user interface, etc.

An operation 1015 determines the number of available execution agents that can be allocated between the data sources and the destination data store. An operation 1020 determines each of the number of threads that can be handled by each of the data source, the number of threads that can be handled by each of the destination data stores, and the number of available execution agents to determine allocation of execution agents to various data sources and destination data stores. For example, a data source may be overwhelmed if a large number of data read threads (larger than what the data source is designed to handle), resulting from allocation of large number of execution agents to read data from that data source, are open at the same time. Similarly, a destination data store may be overwhelmed if a large number of data write threads (larger than what the destination data store is designed to handle), resulting from allocation of large number of execution agents to write data to that data source, are open at the same time. An operation 1025 allocates the execution agents to various data onboarding task work flows based on the determination.

Figure 11:
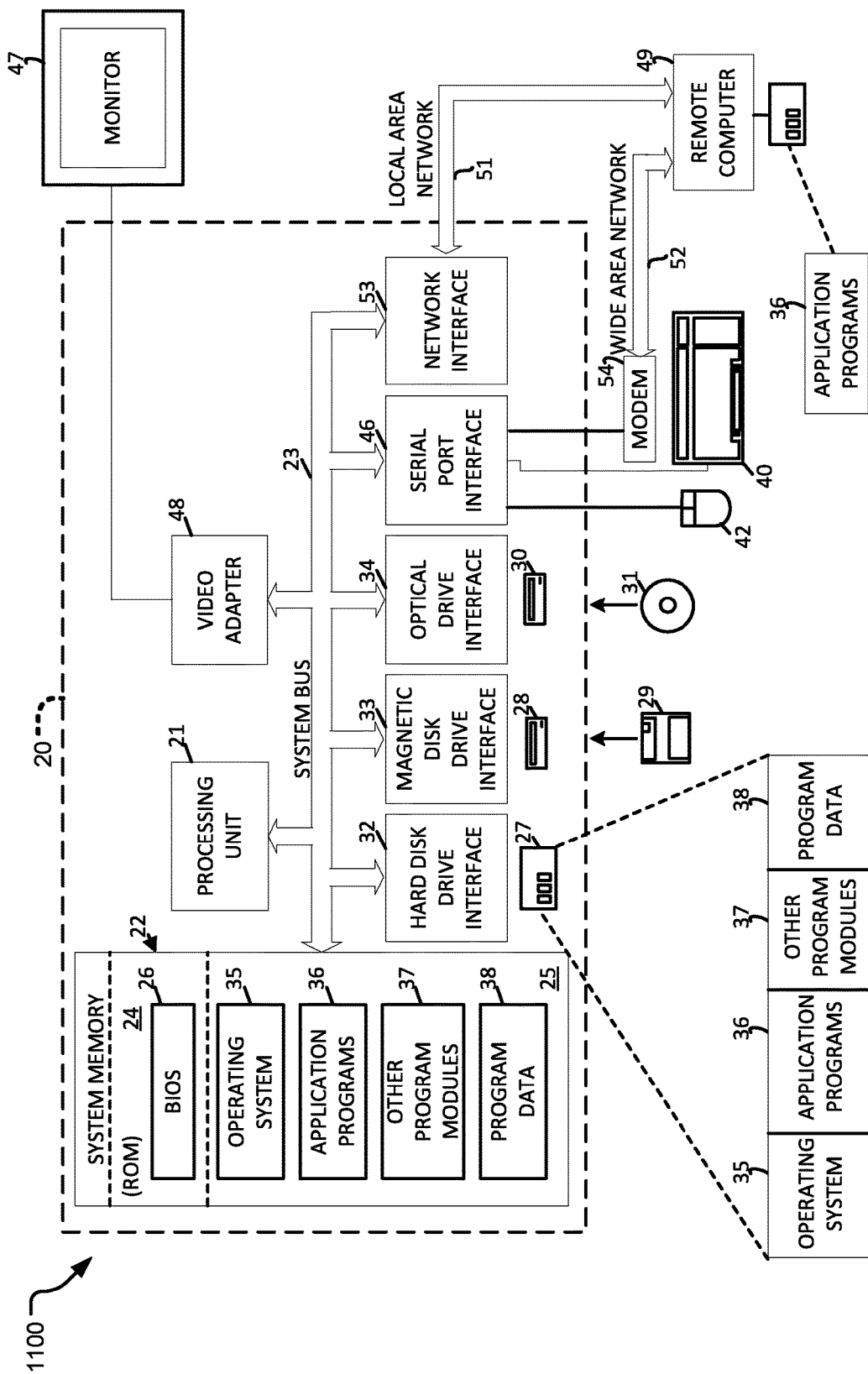
FIG. 11 illustrates an example system that may be useful in implementing the described technology.

FIG. 11 illustrates an example system 1100 that may be useful in implementing the described data onboarding technology. The example hardware and operating environment of FIG. 11 for implementing the described technology includes a computing device, such as a general purpose computing device in the form of a computer 20, a mobile telephone, a personal data assistant (PDA), a tablet, smart watch, gaming remote, or other type of computing device. In the implementation of FIG. 11, for example, the computer 20 includes a processing unit 21, a system memory 22, and a system bus 23 that operatively couples various system components including the system memory to the processing unit 21. There may be only one or there may be more than one processing unit 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read-only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 11 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software or firmware instructions for requesting, processing, and rendering mapping data may be stored in system memory 22 and/or storage devices 29 or 31 and processed by the processing unit 21. Mapping data and/or layer prioritization scheme data may be stored in system memory 22 and/or storage devices 29 or 31 as persistent datastores.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The system for secure data onboarding may include a variety of tangible computer-readable storage media and intangible computer-readable communication signals. Tangible computer-readable storage can be embodied by any available media that can be accessed by the speech recognition device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the speech recognition device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals moving through wired media such as a wired network or direct-wired connection, and signals moving through wireless media such as acoustic, RF, infrared and other wireless media.

An example system to provide a secure data onboarding agent network includes memory, one or more processors, and a data onboarding configurator stored in the memory and executable by the one or more processor units, the data onboarding configurator configured to generate a plurality of data onboarding objects, each of the plurality of data onboarding objects including subscription metadata for reading data from a data source and publication metadata for writing data to a destination data store.

Another example system to provide a secure data onboarding agent network of any preceding system includes an execution engine task store stored in the memory and configured to store a plurality of data onboarding tasks each of the data onboarding tasks configured to read data from the data source using the subscription metadata and to write data to the destination data store using the publication metadata and an execution engine stored in the memory and executable by the one or more processor units, the execution engine configured to execute one or more of the plurality of data onboarding tasks.

Another example system to provide a secure data onboarding agent network of any preceding system includes the execution engine further configured to allocate one or more data readers to each of the selected data onboarding tasks.

Another example system to provide a secure data onboarding agent network of any preceding system includes the execution engine further configured to allocate one or more execution agents to each of the selected data onboarding tasks wherein the one or more of the execution agents are configured to execute the onboarding tasks to read from the data source based on the subscription metadata and to write to the destination data store based on the publication metadata.

Another example system to provide a secure data onboarding agent network of any preceding system includes a data onboarding state store stored in the memory and configured to store states of data onboarding from one or more of a plurality of data sources.

Another example system to provide a secure data onboarding agent network of any preceding system includes a data upload verification engine stored on the memory and configured to execute on one or more of the processors to verify accuracy of data written to the destination data store.

Another example system to provide a secure data onboarding agent network of any preceding system includes the onboarding configurator further configured to generate the plurality of data onboarding objects such that the publication metadata specifies encrypting data from substantially similar data fields from each of a plurality of data sources using a different data encryption key.

Another example system to provide a secure data onboarding agent network of any preceding system includes the data source configured to store data using a format different compared to the destination data store.

Another example system to provide a secure data onboarding agent network of any preceding system includes an application programming interface (API) that is configured to be accessed by one or more execution agents from a non-trusted domain.

Another example system to provide a secure data onboarding agent network of any preceding system includes the one or more execution agents from the non-trusted domain configured to access the API using secure HTTP connection.

Another example system to provide a secure data onboarding agent network of any preceding system includes the API as a REST API.

A method of onboarding data using a secure data onboarding agent network includes determining configuration of a data source, generating subscription metadata for reading data from the data source, determining configuration of a destination data store, generating publication metadata for writing data to the destination data store, and generating a data onboarding object including the subscription metadata and the publication metadata.

Another method of onboarding data using a secure data onboarding agent network of any preceding methods includes generating a plurality of data onboarding tasks configured to pull data from the data source using the subscription metadata and to write data to the destination data store using the publication metadata.

Another method of onboarding data using a secure data onboarding agent network of any preceding methods includes allocating one or more execution agents to the one or more of the plurality of data onboarding tasks.

Another method of onboarding data using a secure data onboarding agent network of any preceding methods includes determining a number of threads that the data source can handle, determining a number of threads that the destination data store can handle; determining a number of available execution agents, and allocating the available execution agents to a data onboarding task based on the number of threads that the data source can handle, the number of threads that the destination data store can handle, and the number of available execution agents.

Another method of onboarding data using a secure data onboarding agent network of any preceding methods includes executing one or more of the plurality of data onboarding tasks and storing states of data onboarding from one or more of a plurality of data sources upon completion of the execution.

Another method of onboarding data using a secure data onboarding agent network of any preceding methods includes verifying accuracy of data written to the destination data store.

Another method of onboarding data using a secure data onboarding agent network of any preceding methods includes generating the plurality of data onboarding tasks further comprises generating a data onboarding task that allocates a first data encryption key to encrypt data of a first data field from a first data source and a second different data encryption key to encrypt data of a second data field from a second data source if the first data field and the second data field stores substantially similar personally identifiable information (PII).

An example data onboarding system includes a memory, one or more processor units a data onboarding configurator stored in the memory and executable by the one or more processor units, the data onboarding configurator configured to generate a plurality of data onboarding objects, each of the plurality of data onboarding objects including subscription metadata for reading data from the data source and publication metadata for writing data to the destination data store and an execution engine task store stored in the memory and configured to store a plurality of data onboarding tasks each of the data onboarding tasks configured to read data from a data source using the subscription metadata and to write data to the destination data store using the publication metadata.

Another example data onboarding system includes the execution engine being further configured to determine a number of execution agents to be allocated to a data onboarding task based on a number of threads that can be handled by a data source associated with the data onboarding task, a number of threads that can be handled by a destination data store associated with the data onboarding task, and a number of execution agents available.

An example physical article of manufacture includes one or more tangible computer-readable storage media, encoding computer-executable instructions for executing on a computer system a computer process, the computer process including determining configuration of a data source, generating subscription metadata for reading data from the data source, determining configuration of a destination data store, generating publication metadata for writing data to the destination data store, and generating a data onboarding object including the subscription metadata and the publication metadata.

Another example physical article of manufacture includes one or more tangible computer-readable storage media, encoding computer-executable instructions for executing on a computer system a computer process, the computer process including generating a plurality of data onboarding tasks configured to pull data from the data source using the subscription metadata and to write data to the destination data store using the publication metadata.

Another example physical article of manufacture includes one or more tangible computer-readable storage media, encoding computer-executable instructions for executing on a computer system a computer process, the computer process including allocating one or more execution agents to the one or more of the plurality of data onboarding tasks.

Another example physical article of manufacture includes one or more tangible computer-readable storage media, encoding computer-executable instructions for executing on a computer system a computer process, the computer process including determining a number of threads that the data source can handle, determining a number of threads that the destination data store can handle; determining a number of available execution agents, and allocating the available execution agents to a data onboarding task based on the number of threads that the data source can handle, the number of threads that the destination data store can handle, and the number of available execution agents.

Another example physical article of manufacture includes one or more tangible computer-readable storage media, encoding computer-executable instructions for executing on a computer system a computer process, the computer process including executing one or more of the plurality of data onboarding tasks and storing states of data onboarding from one or more of a plurality of data sources upon completion of the execution.

Another example physical article of manufacture includes one or more tangible computer-readable storage media, encoding computer-executable instructions for executing on a computer system a computer process, the computer process including verifying accuracy of data written to the destination data store.

Another example physical article of manufacture includes one or more tangible computer-readable storage media, encoding computer-executable instructions for executing on a computer system a computer process, the computer process including generating a data onboarding task that allocates a first data encryption key to encrypt data of a first data field from a first data source and a second different data encryption key to encrypt data of a second data field from a second data source if the first data field and the second data field stores substantially similar personally identifiable information (PII).

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A physical hardware system to provide a secure data onboarding agent network, comprising:
   memory;
   one or more processor units;
   a data onboarding configurator stored in the memory and executable by the one or more processor units, the data onboarding configurator configured to analyze a data source configuration to determine subscription metadata specifying how the data from a data source is to be processed, analyze a destination data store configuration to determine publication metadata specifying how the data is to be stored in a destination data store, and generate a plurality of data onboarding objects, each of the plurality of data onboarding objects including the subscription metadata and the publication metadata; and
   an execution engine task store stored in the memory and configured to store a plurality of data onboarding tasks each of the data onboarding tasks configured to read data from the data source using the subscription metadata and to write data to the destination data store using the publication metadata; and
   an execution engine stored in the memory and executable by the one or more processor units, the execution engine configured to allocate one or more of available execution agents to a data onboarding task based on the number of available execution agents, wherein the execution engine is configured to execute one or more of the plurality of data onboarding tasks.

2. The physical hardware system of claim 1, wherein the execution engine is further configured to allocate one or more data readers to each of the selected data onboarding tasks.

3. The physical hardware system of claim 1, wherein the execution engine is further configured to allocate the one or more execution agents to each of the selected data onboarding tasks wherein the one or more of the execution agents are configured to execute the onboarding tasks to read from the data source based on the subscription metadata and to write to the destination data store based on the publication metadata.

4. The physical hardware system of claim 3, further comprising a data onboarding state store stored in the memory and configured to store states of data onboarding from one or more of a plurality of data sources.

5. The physical hardware system of claim 3, further comprising a data upload verification engine stored on the memory and configured to execute on one or more of the processors to verify accuracy of data written to the destination data store.

6. The physical hardware system of claim 1, wherein the onboarding configurator is further configured to generate the plurality of data onboarding objects such that the publication metadata specifies encrypting data from substantially similar data fields from each of a plurality of data sources using a different data encryption key.

7. The physical hardware system of claim 1, wherein the data source is configured to store data using a format different compared to the destination data store.

8. The physical hardware system of claim 1, further comprising an application programming interface (API) that is configured to be accessed by the one or more execution agents from a non-trusted domain.

9. The physical hardware system of claim 8, wherein the one or more execution agents from the non-trusted domain are configured to access the API using secure HTTP connection.

10. The physical hardware system of claim 8, wherein the API is a representational state transfer (REST) API.

11. A method of onboarding data using a secure data onboarding agent network, the method comprising:
    determining configuration of a data source;
    generating subscription metadata for reading data from the data source;
    determining configuration of a destination data store;
    generating publication metadata for writing data to the destination data store;
    generating a data onboarding object, the data onboarding object including the subscription metadata and the publication metadata;
    allocating one or more available execution agents to a data onboarding task based on a number of threads that a data source can handle, the number of threads that a destination data store can handle, and the number of available execution agents; and
    executing one or more of the plurality of data onboarding tasks.

12. The method of claim 11, further comprising generating a plurality of data onboarding tasks configured to pull data from the data source using the subscription metadata and to write data to the destination data store using the publication metadata.

13. The method of claim 12, further comprising allocating one or more execution agents to the one or more of the plurality of data onboarding tasks.

14. The method of claim 13, further comprising:
    determining the number of threads that the data source can handle;
    determining the number of threads that the destination data store can handle; and
    determining the number of available execution agents.

15. The method of claim 12, further comprising:
    storing states of data onboarding from one or more of a plurality of data sources upon completion of the execution.

16. The method of claim 12, further comprising verifying accuracy of data written to the destination data store.

17. The method of claim 12, wherein generating the plurality of data onboarding tasks further comprises generating a data onboarding task that allocates a first data encryption key to encrypt data of a first data field from a first data source and a second different data encryption key to encrypt data of a second data field from a second data source if the first data field and the second data field stores substantially similar personally identifiable information (PII).

18. A data onboarding system comprising:
memory;
one or more processor units;
a data onboarding configurator stored in the memory and executable by the one or more processor units, the data onboarding configurator configured to analyze a data source configuration to determine subscription metadata specifying how the data from a data source is to be processed, analyze a destination data store configuration to determine publication metadata specifying how the data is to be stored in a destination data store, and generate a plurality of data onboarding objects, each of the plurality of data onboarding objects including the subscription metadata and the publication metadata;
an execution engine task store stored in the memory and configured to store a plurality of data onboarding tasks each of the data onboarding tasks configured to read data from a data source using the subscription metadata and to write data to the destination data store using the publication metadata;
an execution engine configured to allocate execution agents to the data onboarding tasks; and
an execution engine stored in the memory and executable by the one or more processor units, the execution engine configured to allocate one or more of available execution agents to a data onboarding task based on the number of available execution agents, wherein the execution engine configured to execute one or more of the plurality of data onboarding tasks.

19. The data onboarding system of claim 18, wherein the execution engine is further configured to determine a number of the execution agents to be allocated to the data onboarding task based on a number of threads that can be handled by a data source associated with the data onboarding task, a number of threads that can be handled by a destination data store associated with the data onboarding task, and a number of execution agents available.

* * * * *